Aug. 11, 1936.    E. W. BREISCH    2,050,267
ALTERNATING CURRENT RECTIFYING SYSTEM
Original Filed Feb. 12, 1934
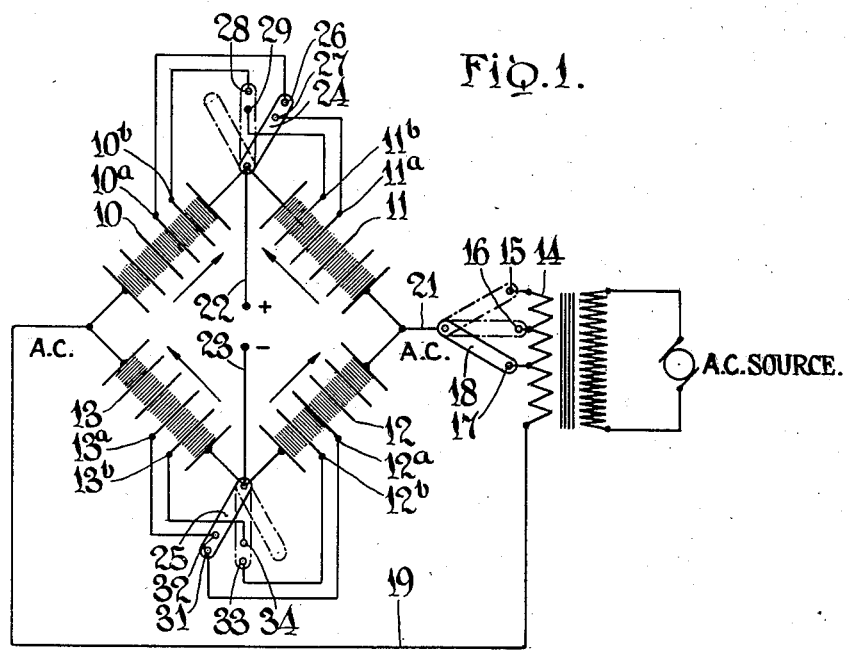
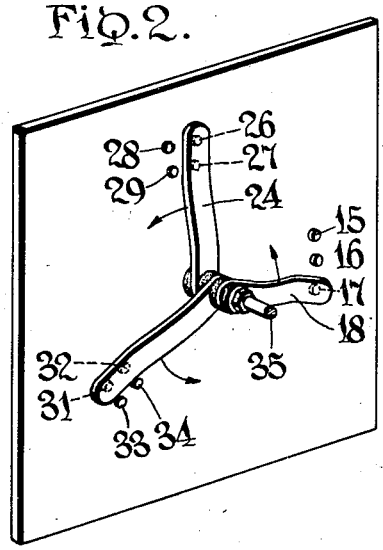
INVENTOR
Edgar W. Breisch,
BY
Beau A Brooks
ATTORNEYS Patented Aug. 11, 1936

2,050,267

UNITED STATES PATENT OFFICE 2,050,267

ALTERNATING CURRENT RECTIFYING SYSTEM

Edgar W. Breisch, Lancaster, N. Y.

Original application February 12, 1934, Serial No. 710,967. Divided and this application October 1, 1934, Serial No. 746,453

6 Claims. (Cl. 175—363)

The present invention relates to a system for rectifying alternating current, and has particular relation to means adapting such system for efficient operation under varying load conditions.

The present application is a division of co-pending application Serial No. 710,967, filed February 12, 1934, for battery charging and testing apparatus. In rectifying systems, such as those employing copper-oxide rectifiers, where the rectifier consists of a plurality of rectifier elements arranged in series, the number of such elements required depends upon the voltage employed, and, of course, the resistance and the current loss in the rectifier system will depend, at least partially, upon the number of such elements. In conventional practice, when such a rectifier system is used under different voltage conditions, as for example, for charging varying members of storage batteries arranged in series necessitating the employment of different voltages, the rectifier, designed for operation under maximum voltage, therefore will be relatively inefficient when operated with lower voltage. The present invention contemplates the provision of means for varying the resistance and the current losses in the rectifier as the voltage is varied, in order that the system may function efficiently under any of the various voltage conditions.

These and other objects and advantages will become apparent from the following description of one typical embodiment of the invention, made in connection with the accompanying drawing, wherein:

Fig. 1 is a wiring diagram of an alternating current rectifying system with the present invention incorporated therein; and, Fig. 2 is a perspective view of switch means shown diagrammatically in Fig. 1.

As shown in Fig. 1, the system includes rectifying units 10, 11, 12 and 13 arranged in bridge formation to rectify alternating current, derived from a suitable source of variable voltage, into direct current for operating a direct current load, such as storage batteries to be charged, connected across output connections 22, 23. Such source may comprise a transformer having its secondary winding 14 tapped at multiple points for connection to multiple contacts, as 15, 16 and 17, adapted for selective engagement by contact arm 18, so that the alternating current potential across the arm 18 and lead 19 from the other end of the secondary winding may be selectively varied. Lead 19 and lead 21 from contact arm 18 are respectively connected to the rectifier units between units 10 and 13 and units 11 and 12 to provide positive and negative potentials to wires 22 and 23, respectively, which are connectible to a load, such as one or more batteries to be charged. Wire 22 is connected between units 10 and 11, wire 23 between units 12 and 13, and the direction of current flow through the units being as indicated by arrows from lead 19 through unit 10 to wire 22 and from wire 23 through unit 12 to lead 21 on one phase, and on the other phase from lead 21 through unit 11 to wire 22 and from wire 23 through unit 13 to lead 19.

Each unit 10, 11, 12, 13 may comprise a stack of copper oxide rectifier discs, or other rectifier, where the number of discs or elements required in one stack or unit depends upon the voltage of the current to be rectified. In such a system two of the rectifier units, for example units 10 and 12 are each in parallel with the load when two other units (in this example units 11 and 13) are in series with the load; and during this phase the units in parallel 10 and 12, constitute high resistances whereas units 11 and 13 constitute relatively low resistances. On the opposite phase, the reverse condition obtains; units 11 and 13 constitute high resistances in parallel with the load, and units 10 and 12 constitute low resistances in series with the load. When the resistance of the load is decreased (as when only one or a few batteries are being charged) and by movement of contact arm 18, as for example into contact with contact 17, to reduce the potential across A. C. leads 19, 21, the resistance of the rectifier units which are in parallel with the load may be similarly reduced without decreasing the rectifying action, and it is desirable to reduce the resistance of the units in series with the load.

According to the present invention means are provided to selectively decrease the resistance of each rectifying unit, when it is in series and also when in parallel with the load, by shunting out or short-circuiting certain of the discs or elements thereof. To this end, the illustrated embodiment includes three position contact arms 24 and 25 connected respectively to wires 22 and 23. In one position (the full line position of Fig. 1) arm 24 engages contact 26 connected to an element 10a intermediate of the ends of rectifier unit 10, and also engages contact 27 connected to an element 11a intermediate the ends of rectifier unit 11; in a second position (shown in broken lines, Fig. 1) arm 24 engages contact 28 connected to element 10b intermediate element 10a and the end of unit 10, and engages contact 29 connected to element 11b intermediate element 11a and the end of unit 11 connected to wire 22; and in the third position (shown in dotted lines) arm 24 is in open position.

Similarly, contact arm 25 in one position (full line, Fig. 1) engages contacts 31 and 32 which are connected respectively to element 12a of rectifier unit 12 and element 13a of unit 13; in the second position (broken line) arm 25 engages contacts 33 and 34 connected to elements 12b and 13b of units 12 and 13 respectively; and in the third position (dotted line) the arm 25 is open.

As shown in Fig. 2, contact arms 18, 24, and 25 may be mounted upon a single shaft 35, being insulated one from the other in any suitable manner, so that all three arms may be moved as a unit by turning the shaft. When the shaft is in its extreme position after counterclockwise movement, arm 18 will engage contact 15 while arms 24 and 25 will be in open position (dotted lines, Fig. 1); maximum voltage will obtain in the circuit and the contacts 26 to 34 inclusive will all be open so that none of the rectifier elements will be shunted. Then upon clockwise movement of shaft 35 to cause arm 18 to close against contact 16, to decrease the circuit voltage, arm 24 will close against contacts 28 and 29 and arm 25 will close against contacts 33 and 34. Accordingly the rectifier elements between elements 10b, 11b, 12b, 13b and the ends of the respective units 10, 11, 12, 13 joined to wires 22, 23 will be shunted, thereby decreasing the resistances of the units. Upon greater clockwise movement of shaft 35 to cause arm 18 to close against contact 17, to further decrease the circuit voltage, arm 24 will connect contacts 26 and 27 to wire 22, and arm 25 will connect contacts 31 and 32 to wire 23, thereby shunting the rectifier elements between the ends of the units and elements 10a, 11a, 12a, 13a and still further reducing the resistances of the rectifier units.

It will be understood that the apparatus shown and described is merely illustrative of the principles involved and that the invention comprehends the embodiment of these principles in other forms of apparatus. For example, various well known forms of switches other than the arms 24, 25 and contacts 26 to 34 may be substituted therefor in order to shunt out elements of the rectifier units, and the number of intermediate points of connection to the rectifier units may be either increased or decreased in order to provide any desired number of variations of resistance other than the three illustrated.

What I claim is:

1. In rectifying apparatus, a plurality of stacks of copper oxide rectifier discs, said stacks being arranged to form a bridge with alternating current input connections and direct current output connections, and means for simultaneously shunting discs of said stacks to simultaneously reduce the effective number of discs in each stack.

2. In rectifying apparatus, a plurality of stacks of copper oxide rectifier discs, said stacks being arranged to form a bridge with alternating current input connections and direct current output connections, a source of alternating current for connection to said input connections means for varying the potential difference across said input connections, and means for simultaneously varying the effective number of discs in each of said stacks, whereby the effective number of discs in each stack will be maintained substantially directly proportionate to said potential difference.

3. In rectifying apparatus, a plurality of rectifier units arranged to form a bridge, each unit comprising a plurality of rectifier elements arranged in series, and means for simultaneously shunting elements in each of said units to reduce the number of elements in series in each unit.

4. In rectifying apparatus, a plurality of rectifier units arranged to form a bridge to provide input connections to an alternating current source and output connections to a direct current load, each of said units comprising a plurality of rectifier elements arranged in series, means for simultaneously varying the number of said elements in series in each of said units, and means for varying the voltage of the alternating current across said input connections.

5. In rectifying apparatus, a plurality of rectifier units arranged to form a bridge to provide input connections to an alternating current source and output connections to a direct current load, each of said units comprising a plurality of rectifier elements arranged in series, means for simultaneously varying the number of said elements in series in each of said units, and means for varying the voltage of the alternating current across said input connections, and means associating said first and second mentioned means whereby the number of elements in series in each unit will be varied in substantially direct proportion to variation of said voltage of the alternating current.

6. In rectifying apparatus, a rectifying unit in series with a single source of alternating current and a load for providing unidirectional current flow through the load, said unit comprising a plurality of rectifier elements in series, means for varying the voltage of the circuit, and means coordinated with the first mentioned means for varying the number of rectifier elements in series with said source and said load in substantially direct proportion to variation of said voltage by said first mentioned means.

EDGAR W. BREISCH.